United States Patent
Baser

(10) Patent No.: US 12,485,643 B2
(45) Date of Patent: Dec. 2, 2025

(54) PLANAR COMPOSITE MATERIAL

(71) Applicant: Mitsubishi Chemical Advanced Materials Composites AG, Lenzburg (CH)

(72) Inventor: Burak Baser, Aarburg (CH)

(73) Assignee: Quadrant Plastic Composites AG, Lenzburg (CH)

( * ) Notice: Subject to any disclaimer, the term of this patent is extended or adjusted under 35 U.S.C. 154(b) by 1341 days.

(21) Appl. No.: 16/849,535

(22) Filed: Apr. 15, 2020

(65) Prior Publication Data

US 2020/0238659 A1 Jul. 30, 2020

Related U.S. Application Data

(63) Continuation of application No. 15/702,146, filed on Sep. 12, 2017, now abandoned, which is a
(Continued)

(30) Foreign Application Priority Data

Feb. 8, 2012 (EP) .................................... 12154516

(51) Int. Cl.
*B29C 70/02* (2006.01)
*B29C 39/20* (2006.01)
(Continued)

(52) U.S. Cl.
CPC .............. *B32B 5/26* (2013.01); *B29C 39/203* (2013.01); *B29C 43/305* (2013.01);
(Continued)

(58) Field of Classification Search
CPC ... B29C 39/203; B29C 43/305; B29C 51/145; B29C 70/02; B29C 70/20; B29C 70/202; B29C 70/205; B29C 70/207; B29C 70/24; B29C 70/28; B29C 70/465; B29C 70/506; B32B 5/022; B32B 5/06; B32B 5/073;
(Continued)

(56) References Cited

U.S. PATENT DOCUMENTS 1,860,090 A 5/1932 Fowler
3,260,640 A 7/1966 Owen
(Continued)

FOREIGN PATENT DOCUMENTS

EP 0203803 12/1986
EP 1125728 A1 8/2001
(Continued)

OTHER PUBLICATIONS

International Search Report for PCT/EP2013/052616, English translation attached to original. Both completed by the European Patent Office on Mar. 15, 2013.

*Primary Examiner* — Michael A Tolin
(74) *Attorney, Agent, or Firm* — BROOKS KUSHMAN P.C.

(57) ABSTRACT

A sheetlike composite material including at least one layer A of a nonwoven thermoplastic fiber web or a thermoplastic film, and at least two unidirectional oriented-fiber layers B and B', the layers B and B' having a bidirectional fiber orientation. The layers are not only needled but also stitched to one another.

20 Claims, 1 Drawing Sheet

Related U.S. Application Data continuation of application No. 14/378,569, filed as application No. PCT/EP2013/052616 on Feb. 8, 2013, now abandoned.

(51) Int. Cl.

| | | |
|---|---|---|
| B29C 43/30 | (2006.01) | |
| B29C 51/14 | (2006.01) | |
| B29C 70/24 | (2006.01) | |
| B29C 70/28 | (2006.01) | |
| B29C 70/50 | (2006.01) | |
| B32B 5/02 | (2006.01) | |
| B32B 5/06 | (2006.01) | |
| B32B 5/08 | (2006.01) | |
| B32B 5/10 | (2006.01) | |
| B32B 5/12 | (2006.01) | |
| B32B 5/26 | (2006.01) | |
| B32B 27/08 | (2006.01) | |
| B32B 27/12 | (2006.01) | |
| B32B 27/28 | (2006.01) | |
| B32B 27/32 | (2006.01) | |
| B32B 27/34 | (2006.01) | |
| B32B 38/00 | (2006.01) | |
| D04H 1/46 | (2012.01) | |
| D04H 1/48 | (2012.01) | |

(52) U.S. Cl.
CPC ............ *B29C 51/145* (2013.01); *B29C 70/24* (2013.01); *B29C 70/506* (2013.01); *B32B 5/022* (2013.01); *B32B 5/06* (2013.01); *B32B 5/08* (2013.01); *B32B 5/10* (2013.01); *B32B 5/12* (2013.01); *B32B 27/08* (2013.01); *B32B 27/12* (2013.01); *B32B 27/285* (2013.01); *B32B 27/288* (2013.01); *B32B 27/32* (2013.01); *B32B 27/34* (2013.01); *B32B 38/0012* (2013.01); *D04H 1/46* (2013.01); *B29C 70/02* (2013.01); *B29C 70/28* (2013.01); *B32B 2038/008* (2013.01); *B32B 2250/03* (2013.01); *B32B 2250/04* (2013.01); *B32B 2250/05* (2013.01); *B32B 2250/40* (2013.01); *B32B 2262/02* (2013.01); *B32B 2262/0253* (2013.01); *B32B 2262/0261* (2013.01); *B32B 2262/101* (2013.01); *B32B 2262/106* (2013.01); *B32B 2262/14* (2013.01); *B32B 2305/08* (2013.01); *D04H 1/48* (2013.01); *Y10T 156/1044* (2015.01); *Y10T 428/24091* (2015.01); *Y10T 428/24132* (2015.01)

(58) Field of Classification Search
CPC .... B32B 5/08; B32B 5/10; B32B 5/12; B32B 5/26; B32B 7/09; B32B 27/08; B32B 27/12; B32B 27/285; B32B 27/288; B32B 27/32; B32B 27/34; B32B 38/0012; B32B 2038/008; B32B 2250/03; B32B 2250/04; B32B 2250/05; B32B 2250/40; B32B 2262/02; B32B 2262/0253; B32B 2262/0261; B32B 2262/101; B32B 2262/106; B32B 2262/14; B32B 2262/144; B32B 2305/08; D04H 1/46; D04H 1/48; Y10T 156/1044; Y10T 428/24091; Y10T 428/24132

See application file for complete search history.

(56) References Cited

U.S. PATENT DOCUMENTS

| | | |
|---|---|---|
| 3,329,552 A | 7/1967 | Hughes |
| 3,337,387 A | 8/1967 | Owen |
| 3,395,065 A | 7/1968 | Owen |
| 3,614,936 A | 10/1971 | Philipps |
| 3,616,124 A | 10/1971 | Danhel |
| 3,761,345 A | 9/1973 | Smith |
| 5,055,242 A * | 10/1991 | Vane ............... B29C 70/202 264/171.11 |
| 5,843,557 A | 12/1998 | Sternlieb |
| 5,910,458 A | 6/1999 | Beer et al. |
| 6,105,223 A | 8/2000 | Brown et al. |
| 6,881,288 B2 | 4/2005 | Davies et al. |
| 2004/0177911 A1 | 9/2004 | Dittmar |
| 2007/0079487 A1 | 4/2007 | Ritter et al. |
| 2010/0255251 A1 | 10/2010 | LeRoy |
| 2016/0244899 A1 | 8/2016 | Minamide |

FOREIGN PATENT DOCUMENTS

| | | | | |
|---|---|---|---|---|
| EP | 1473132 A2 | 11/2004 | | |
| WO | WO-2005033393 A1 * | 4/2005 | ............ | B29C 70/32 |
| WO | 2006111037 | 10/2006 | | |
| WO | WO-2006111037 A1 * | 10/2006 | ........... | B29C 70/465 |

\* cited by examiner

PLANAR COMPOSITE MATERIAL

CROSS-REFERENCE TO RELATED APPLICATION

This application is a continuation of U.S. application Ser. No. 15/702,146, filed Sep. 12, 2017, now abandoned, which is a continuation of U.S. application Ser. No. 14/378,569, filed Aug. 22, 2014, now abandoned, which is the U.S. National Phase of PCT/EP2013/052616 filed Feb. 8, 2013, which claims priority to European Patent Application No. 12154516.4 filed Feb. 8, 2012, the disclosures of which are incorporated in their entirety by reference herein.

BACKGROUND OF THE INVENTION

1. Field of the Invention

The invention relates to a planar composite material containing two differently oriented unidirectional fiber-reinforced layers and at least one non-woven thermoplastic fiber layer or thermoplastic foil layer, stitched and needled to each other, and to a process for its production and to its use.

2. Description of the Related Art

Thermoplastics are increasingly used for producing molded parts, particularly components for automobiles, due to their low weight. To provide them with a sufficient strength and rigidity they are usually compounded with reinforcing fibers. For example, planar semifinished products are produced from glass mat reinforced thermoplastics by means of merging endless glass fiber mats having randomly oriented fibers with thermoplastic molten sheets and consolidating on a double band press. From the planar semifinished product thus obtained, components can be produced by means of heat pressing in a mold. However, in this process the fiber reinforcement is nondirectional, i.e., it acts equally in all directions with no preferred direction so that the strength of such composites is limited. However, in many cases components that are reinforced in preferred orientations are required. This can be achieved by using fiber woven or oriented fiber layers made of parallel reinforcing fiber bundles (rovings) as reinforcing fibers. For example, in WO 2006/111037, there is described a planar composite material which contains a fiber nonwoven-layer made of thermoplastic fibers and a woven or oriented layer made of parallel reinforcing fiber bundles. The individual layers can be either needled together or thermally bonded to each other. This composite material can be processed by means of heat pressing to form components having controlled reinforcement.

Upon needling, the fiber bundles are opened and the fibers are partially broken. In this process, however, the individual fibers are slightly displaced with respect to each other so that the orientation is partially removed and the reinforcing effect is reduced. Upon stitching, the individual fiber bundles are connected, by means of binding threads, to each other and to the fibers of the nonwoven layer. In this process, however, the fiber bundles are not opened so that the thermoplastic melt can soak the woven or oriented fiber layer only incompletely, thus resulting in a lower loading capacity of the components produced therefrom.

Therefore, it was an object of the invention to provide composite materials reinforced with oriented fiber layers which do not have the respective disadvantages mentioned.

A further object of the invention is to provide planar composite materials which have a reinforcement in several directions, from which components with a bidirectional reinforcement can be produced.

In principle, the latter is also achieved with the composite materials according to WO 2006/111037 if a fiber woven fabric is used for reinforcing. However, in woven fabrics the fiber bundles are undulated at the crossing points, thus resulting in a reduction of the compressive strength in the fiber direction. Moreover, there is no thermoplastic at the crossing points between the fiber bundles. These dry spots result in an irregular impregnation. Also these disadvantages should be avoided by the present invention.

Other types of planar composite materials are described in EP 0 203 803 A1 and U.S. Pat. No. 3,761,345 A.

EP 0 203 803 A1 relates to a reinforced resin mass which contains layers made of parallel reinforcing fibers and buffer layers made of aramide fibers. The fiber structure is embedded into a hardened resin. Aramide fibers are high performance reinforcement fibers made of an aromatic polyamide that in contrast to the aliphatic polyamides cannot be melted and, therefore, cannot be thermoplastically processed.

U.S. Pat. No. 3,761,345 A describes a fiber complex that can absorb a resin. Glass fiber reinforced resin products can be produced therefrom by hardening of the resin. The fiber complex consists of a plurality of layers. Therein, the fibers can be present either unidirectionally or in the form of loops; furthermore, the central layer can also consist of tangled bundles of short chopped fibers. Fiber nonwoven layers in which the fibers consist at least partially of a thermoplastic are not disclosed in U.S. Pat. No. 3,761,345 A; moreover the production of components or semifinished products by means of thermoplastic heat pressing of the composite materials is not described.

SUMMARY OF THE INVENTION

Therefore, an object of the invention is a planar composite material, comprising
 at least one layer A made of a fiber nonwoven consisting of 40 to 100 wt.-% thermoplastic fibers and 60 to 0 wt.-% reinforcing fibers, or of a thermoplastic foil, and
 at least two unidirectionally oriented fiber layers B and B' made of parallel reinforcing fiber bundles, wherein the layers B and B' have a bidirectional fiber orientation.

According to the present invention, in the composite material the layers are both stitched to each other and also needled.

DETAILED DESCRIPTION OF THE PREFERRED EMBODIMENT

The term "thermoplastic" as generally known in the technical field is to be understood in such manner that the corresponding materials can be melted and thermoplastically molded under conventional processing conditions.

According to an advantageous embodiment the fiber nonwoven of the layer A contains up to 50 wt.-% reinforcing fibers. According to another advantageous embodiment the fiber nonwoven of the layer A contains no reinforcing fibers and is, therefore, only made of thermoplastic fibers. According to a further advantageous embodiment the layer A is made of a thermoplastic foil.

"Bidirectional" in the context with two oriented fiber layers B and B' means that the longitudinal axis of the oriented fiber layer B is not parallel to the longitudinal axis of the oriented fiber layer B'.

Further objects of the invention are processes for producing such composite materials. There are two variants therefor:

In the first variant, initially the fiber nonwoven-layer(s) A are produced according to the carding, airlay or spunbound nonwoven process or according to so-called paper making process, and subsequently the oriented fiber layers B and B', which are bidirectionally aligned to each other, are continuously joined together with the layer(s) A. The layers are subsequently stitched to each other and thereafter needled.

In the second variant, the thermoplastic foil(s) of the layer A and the oriented fiber layers of the layers B and B', which are bidirectionally aligned to each other, are continuously joined, stitched to each other and are thereafter needled.

Preferred layer arrangements are B-A-B' and B-A-B'-A-B. Further arrangements with a plurality of up to 20 layers are possible. It is preferred that always a fiber nonwoven or a thermoplastic foil layer A is arranged between two oriented layers B or B'. For specific applications, an arrangement in which one layer A is arranged at the outside is also possible.

The fiber orientation of the layers B or B' is bidirectional, and preferred orientations are 0°/90°, 30°/−30°, 45°/−45° and 60°/−60° with respect to a reference direction in the layer arrangement such as, for example, its longitudinal axis L. Accordingly, the acute angle between the respective fiber directions is preferably 60° or 90°. Thereby, the layers are preferably arranged symmetrically.

Figure 1:
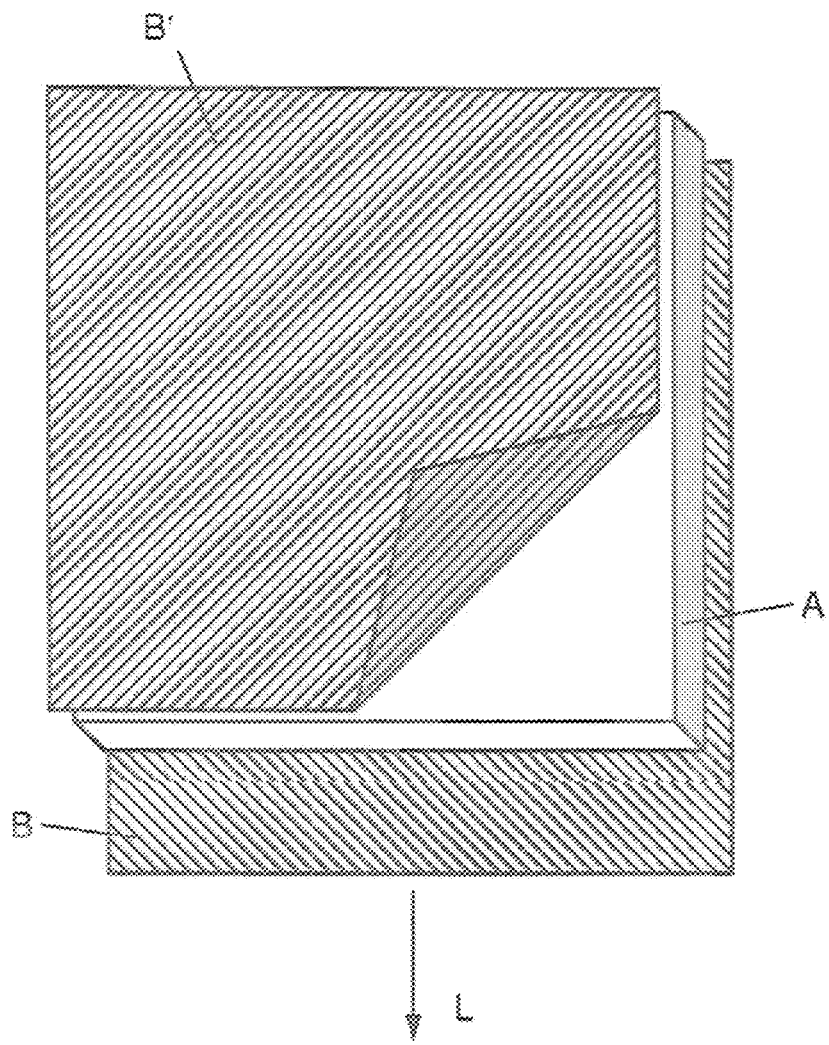
FIG. 1 shows a schematic perspective view of an example composite material according to one or more embodiments.

FIG. 1 shows in a perspective view a layer arrangement B-A-B' with a bidirectional fiber orientation 45°/−45° of the layers B and B', respectively, with respect to a longitudinal axis L.

The areal weights of the individual layers are preferably between 20 to 1,000 g/m², particularly between 30 to 1,000 g/m², more particularly between 150 and 300 g/m². The individual oriented fiber layers may also have different areal weights. The areal weights are to be selected in such manner that the portion of the total reinforcing fibers in the composite material is preferably 20 to 80 wt.-%, more preferably 30 to 70 wt.-% and most preferably about 60 wt.-%.

Preferred reinforcing fibers are glass fibers and carbon fibers; but also aramide fibers, basalt fibers, natural fibers, and fibers from higher melting polymers, as well as hybrid fibers, for example from glass fibers and polypropylene fibers, are suitable. Preferably, the fiber types are in each case the same in the individual layers. The reinforcing fibers of the oriented fiber layer are preferably present as fiber bundle with a titer between 300 and 4,800 tex.

Preferred thermoplastics in the fiber nonwoven or in the thermoplastic foil are polypropylene and meltable polyamides, particularly aliphatic polyamides; in addition, other thermoplastics such as polyester, polyether sulfone, polyether ketones and polyether imide are also suitable. Polyether ketones stand out particularly by a good heat resistance. Composite materials having a particularly good flowability can be obtained if the thermoplastic is polypropylene with a melt flow index (melt flow index, MFI) (230° C., 2.16 kg) between 10 and 400, particularly at about 120 g/10 min. The thermoplastics for producing the fiber nonwoven of the layer A can be provided in many different dimensions and geometries.

The individual layers of the composite material are both stitched to each other and also needled.

Upon stitching, the fiber bundles of the oriented fiber layer are connected to each other by means of a stitching thread which forms meshes. Thereby, the reinforcing fibers are fixed in their parallel orientation. Suitable stitching threads can be made of glass, polypropylene, polyamide, and also of PET or polyether ketones. Acetate and viscose threads can also be used.

Preferably, the stitching threads are made of the same thermoplastic as the thermoplastic fibers or the thermoplastic foil of the layer A, that is, preferably also of polypropylene or polyamide.

Figure 2:
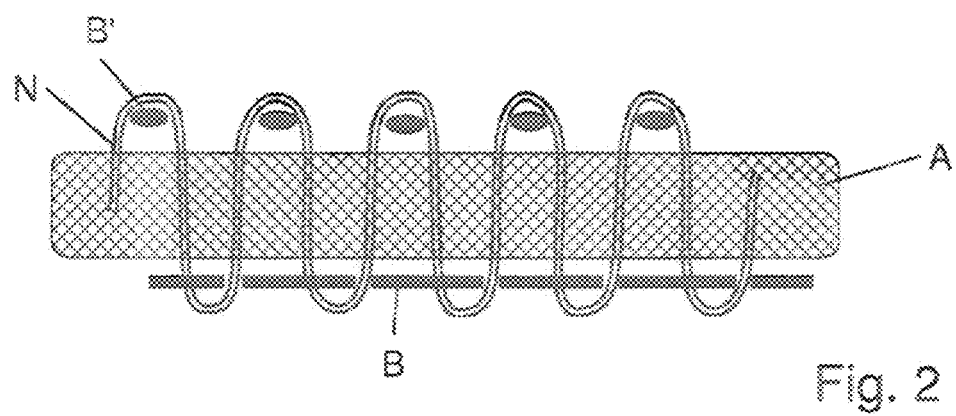
FIG. 2 shows a cross-sectional view of the composite material depicted in FIG. 1.

FIG. 2 show the layer arrangement B-A-B' of FIG. 1 in a cross section along the fiber orientation of the layer B after stitching. Thereby, the stitching thread N connects the fiber bundles of the layers B' and B. Subsequently, this layer arrangement is also needled.

Upon needling, as already explained, the fiber bundles are opened and the fibers are partially broken. Moreover, thermoplastic fibers are drawn out of the nonwoven into the oriented fiber layer by the barbs of the needles. The same happens also upon needling the thermoplastic foil, where fragments or threads are torn out of the foil and drawn into the oriented fiber layer by the barbs. The needling can be carried out on conventional needling looms with felting needles. The number of needle stitches may vary between 5 and 100 per cm², particularly between 20 and 40 punctures per cm².

All this has the result that by the subsequent hot pressing the thermoplastic melt penetrates from the fiber nonwoven or from the thermoplastic foil into the oriented fiber layers and can impregnate the same uniformly. If the stitching thread consists of the same thermoplast, it will also melt during the hot pressing; thereafter it is no longer needed.

Due to the fact that the fiber bundles are additionally stitched to each other, they keep their orientation upon needling, and because by the needling also the oriented fiber layer is connected to the fiber nonwoven layer or to the thermoplastic foil, there is also no risk for the layers to slip out of position during the transport and the subsequent processing.

At temperatures above the softening range of the thermoplastic the planar composite materials of the present invention can be directly pressed in molds to form three-dimensional components, or they can be consolidated by means of heat pressing, for example, in a double band press, to planar semifinished products, preferably with a thickness of 0.5 to 5 mm.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for producing three-dimensional components, or planar semifinished products with a thickness of 0.5 to 5 mm, comprising:
   (I) for the three-dimensional components,
      heat pressing in a mold, a stitched and needled thermoformable composite material comprising
         a) at least one layer A comprising A1 a fiber nonwoven comprising 40 to 100 wt.-% thermoplastic fibers and 60 to 0 wt.-% reinforcing fibers,
or comprising,
A2 a thermoplastic film,
and
b) at least two unidirectionally oriented fiber layers B, each layer B comprising parallel reinforcing fiber bundles, wherein at least one layer B has a different fiber orientation relative to another layer B,
wherein all layers are stitched together and subsequently needled, and after heat pressing, obtaining a three-dimensional component, the stitched and needled thermoformable composite material formed by:
a) continuously merging together at least one fiber nonwoven layer A1 produced by a carding, airlay or spunbonded nonwoven process, with at least two unidirectionally oriented fiber layers B, at least one layer B having a different fiber orientation relative to another layer B, and subsequently stitching all the layers to each other, and thereafter needling all the layers;
or:
b) continuously merging together at least one thermoplastic film layer A2 with at least two unidirectionally oriented fiber layers B, at least one layer B having a different fiber orientation relative to another layer B, stitching all the layers to each other, and thereafter needling all the layers, and (II) for the planar semifinished products,
heat pressing in a double band press a stitched and needled thermoformable composite material comprising
a) at least one layer A comprising
A1 a fiber nonwoven comprising 40 to 100 wt.-% thermoplastic fibers and 60 to 0 wt.-% reinforcing fibers,
or comprising,
A2 a thermoplastic film,
and
b) at least two unidirectionally oriented fiber layers B, each layer B comprising parallel reinforcing fiber bundles, wherein at least one layer B has a different fiber orientation relative to another layer B,
wherein all layers are stitched together and also subsequently needled,
the stitched and needled thermoformable composite material formed by:
b) continuously merging together at least one fiber nonwoven layer A1 produced by a carding, airlay or spunbonded nonwoven process, with at least two unidirectionally oriented fiber layers B, at least one layer B having a different fiber orientation relative to another layer B, and subsequently stitching all the layers to each other and thereafter needling all the layers;
or:
b) continuously merging together at least one thermoplastic film layer A2 with at least two unidirectionally oriented fiber layers B', at least one layer B' having a different fiber orientation relative to another layer B, stitching all the layers to each other, and thereafter needling all the layers.

2. The method of claim 1, wherein the three-dimensional component is produced.

3. The method of claim 2, wherein the thermoformable composite material has a layer arrangement of B-A-B or B-A-B-A-B.

4. The method of claim 2, wherein the fiber orientation of two layers B with respect to a reference direction of the thermoformable composite material is 0°/90°, 30°/−30°, 45°/−45° or 60°/−60°.

5. The method of claim 2, wherein the areal weights of all the layers of the thermoformable composite material each are 20 to 1,000 g/m².

6. The method of claim 2, wherein the areal weights of all the layers of the thermoformable composite material each are 150 to 300 g/m².

7. The method of claim 2, wherein the total amount of reinforcing fibers in the thermoformable composite material is 20 to 80 wt.-%, based on the total weight of the thermoformable composite material.

8. The method of claim 2, wherein the layers are merged to form an arrangement B-A1-B or B-A1-B-A1-B.

9. The method of claim 2, wherein the layers are merged to form an arrangement B-A2-B or B-A2-B-A2-B.

10. The method of claim 2, wherein the layers are merged to form an arrangement such that a thermoplastic film A2 is present on an outside of the thermoformable composite material.

11. The method of claim 1, wherein the planar semifinished product with a thickness of 0.5 to 5 mm is produced.

12. The method of claim 11, wherein the thermoformable composite material has a layer arrangement of B-A-B or B-A-B-A-B.

13. The method of claim 11, wherein the areal weights of all the layers of the thermoformable composite material each are 20 to 1,000 g/m².

14. The method of claim 11, wherein the areal weights of the individual layers of the thermoformable composite material each are 150 to 300 g/m².

15. The method of claim 11, wherein the total amount of reinforcing fibers in the thermoformable composite material is 20 to 80 wt.-%, based on the total weight of the thermoformable composite material.

16. The method of claim 11, wherein the layers are merged to form an arrangement B-A1-B or B-A1-B-A1-B.

17. The method of claim 11, wherein the layers are merged to form an arrangement B-A2-B or B-A2-B-A2-B.

18. The method of claim 11, wherein the layers are merged to form an arrangement such that a thermoplastic film A2 is present on an outside of the thermoformable composite material.

19. A method for producing a three-dimensional component is produced, comprising:
heat pressing in a mold a stitched and needled thermoformable composite material comprising
a) at least one layer A comprising
A1 a fiber nonwoven comprising 40 to 100 wt.-% thermoplastic fibers and 60 to 0 wt.-% reinforcing fibers,
and
b) at least two unidirectionally oriented fiber layers B, each layer B comprising parallel reinforcing fiber bundles, wherein at least one layer B has a different fiber orientation relative to another layer B,
wherein all layers are both stitched together and also subsequently needled, thereby obtaining a three dimensional component,
the stitched and needled thermoformable composite material formed by:

a) continuously merging together at least one fiber nonwoven layer A1 produced by a carding, airlay or spunbonded nonwoven process, with at least two unidirectionally oriented fiber layers B, at least one layer B having a different fiber orientation relative to another layer B, and subsequently stitching all the layers to each other and thereafter needling all the layers.

20. A method for producing a planar semifinished product with a thickness of 0.5 to 5 mm is produced, comprising heat pressing in a double band press a stitched and needled thermoformable composite material, comprising a) at least one layer A comprising
   A1 a fiber nonwoven comprising 40 to 100 wt.-% thermoplastic fibers and 60 to 0 wt.-% reinforcing fibers, and b) at least two unidirectionally oriented fiber layers B, each layer B comprising parallel reinforcing fiber bundles, wherein at least one layer B has a different fiber orientation relative to another layer B, wherein all layers are both stitched together and also subsequently needled, the stitched and needled thermoformable composite material formed by:

a) continuously merging together at least one fiber nonwoven layer A1 produced by a carding, airlay or spunbounded nonwoven process, with at least two unidirectionally oriented fiber layers B, at least one layer B having a different fiber orientation relative to another layer B and subsequently stitching all the layers to each other, and thereafter needling all the layers.

* * * * *